United States Patent
Huang et al.

(10) Patent No.: US 7,855,822 B2
(45) Date of Patent: Dec. 21, 2010

(54) PHOTOSENSITIVE ELECTROCHROMIC DEVICE

(75) Inventors: Lee-May Huang, Hsinchu (TW); Chun-Heng Chen, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 58 days.

(21) Appl. No.: 12/464,851

(22) Filed: May 12, 2009

(65) Prior Publication Data
US 2010/0208324 A1  Aug. 19, 2010

(30) Foreign Application Priority Data
Feb. 13, 2009 (TW) .............................. 98104654 A

(51) Int. Cl.
*G02F 1/153* (2006.01)
*H01L 31/00* (2006.01)
(52) U.S. Cl. .................. 359/275; 136/252; 136/263
(58) Field of Classification Search ............. 136/244, 136/251, 252, 256, 263; 359/265, 275; 429/111
See application file for complete search history.

(56) References Cited

U.S. PATENT DOCUMENTS

| | | | |
|---|---|---|---|
| 5,377,037 A | 12/1994 | Branz et al. | |
| 5,384,653 A | 1/1995 | Benson et al. | |
| 5,805,330 A | 9/1998 | Byker et al. | |
| 6,055,089 A | 4/2000 | Schulz et al. | |
| 6,369,934 B1 | 4/2002 | Bechinger et al. | |
| 2007/0115399 A1 | 5/2007 | Brabec et al. | |
| 2010/0000590 A1 * | 1/2010 | Huang ..................... | 136/244 |

OTHER PUBLICATIONS

"ist Office Action of German counterpart application", issued on Oct. 2, 2009, p. 1-p. 5.

* cited by examiner

*Primary Examiner*—David N Spector
(74) *Attorney, Agent, or Firm*—Jianq Chyun IP Office

(57) ABSTRACT

A photosensitive electrochromic device includes a transparent non-conductive substrate, a thin-film solar cell module and an electrochromic solution. The thin-film solar cell module is a monolithic series-connected module and includes a transparent substrate and a plurality of thin-film solar cells located on the transparent substrate, wherein all the thin-film solar cells in the thin-film solar cell module are connected in series, and the above-mentioned electrochromic solution is located between the transparent non-conductive substrate and the thin-film solar cell module.

17 Claims, 9 Drawing Sheets

PHOTOSENSITIVE ELECTROCHROMIC DEVICE

CROSS-REFERENCE TO RELATED APPLICATION

This application claims the priority benefit of Taiwan application serial no. 98104654, filed Feb. 13, 2009. The entirety of the above-mentioned patent application is hereby incorporated by reference herein and made a part of specification.

BACKGROUND OF THE INVENTION

1. Field of the Invention

The present invention generally relates to a photosensitive electrochromic device.

2. Description of Related Art

A regular electrochromic device may serve as a smart window for power saving and be used in green buildings, but it still requires an electric energy source, which consumes energy. Typical electrochromic devices are categorized into a solid type and a liquid type. A solid electrochromic device has a structure as shown in FIG. 1, where an upper layer and a lower layer of an electrochromic device 100 are respectively formed by a glass/plastic transparent substrate 102. There are at least five coated/deposited layers with different functions disposed between the two transparent substrates 102, and the five layers are, for example, two transparent conductive layers 104, an electrochromic layer 106, an electrolyte layer 108 and an ion storage layer 110, which are sandwiched into a combination to form a structure similar to a battery.

FIG. 2 is a structural view of a conventional liquid-type electrochromic device, wherein a device 200 is constituted of two transparent conductive substrates 202. Generally, one of the transparent conductive substrates 202 contains a transparent substrate 204 and an anode 206, and the other contains the transparent substrate 204 and a cathode 206 opposite to the anode 206. An electrochromic solution 208 is disposed between the two transparent conductive substrates 202 and includes an organic small molecule electrochromic material and an electrolyte solution.

Due to the increasing energy-saving consciousness, a novel building integrated photovoltaics (BIPV) system implemented by combining solar cells and electrochromic devices has been developed, which has become a new tendency nowadays. With BIPV system, no additional power is needed to automatically adjust the color shade of windows with electrochromic glass according to the variation of indoor and outdoor luminance, which has great advantages in reducing indoor heat to achieve energy-saving purpose.

The present invention is directed to a photosensitive electrochromic device, in which an employed silicon thin-film solar cell module serves as an element of the device converts light energy into electric energy for color changing, so as to suit green energy-saving purposes. When combined with specifically designed switches, the photosensitive electrochromic device can supply electric current to AC electrics and DC electrics through connection with a DC/AC converter and a DC charge storage apparatus, which provides a new power source under the present energy crisis.

So far, the development of photoelectrochromic device relies on dye sensitive solar cells for generating electric power. U.S. Pat. No. 6,369,934B1 disclosed an all-organic multi-layer photoelectrochemistry device. However, to apply a typical structure like this in practice, many problems need to be solved, for example, the stability of the employed photosensitive layer or the feasibility of enlarging the area of the device.

U.S. Pat. No. 5,377,037 provides a design that combines a solar cell and an electrochromic device into a single device, wherein on a first conductive glass substrate, a silicon thin-film solar cell module and an inorganic electrochromic device are disposed in tandem arrangement and combined into one element. The element faces the second transparent conductive substrate on the opposite side and a liquid organic electrolyte solution or a solid inorganic electrolyte layer is disposed between the two elements. However, the inorganic electrochromic material intrinsically requires a high driving voltage and a high charge density for working, and thus the thickness of the intrinsic layers of the silicon thin-film solar cells can not be reduced, which leads to a lower contrast given by the device and becomes a barrier for its application in the smart window.

U.S. Pat. No. 5,805,330 provides an all-organic structure, wherein both an upper layer and a lower layer are transparent conductive substrates, and an organic small molecule electrochromic material and an electrolyte solution are disposed therebetween. A solar cell module adheres to the edge of the electrochromic glass, so that when illuminated by sunlight, the current generated by the solar cell is supplied to the electrochromic device via an output terminal of the cell and the electrochromic device thereby changes color.

U.S. Pat. No. 6,055,089 provides an electrochromic system that combines a solar cell with an electrochromic device, wherein an inorganic electrochromic glass is disposed in front of a silicon crystal solar cell module, and a layer of air is between the inorganic electrochromic glass and the silicon crystal solar module. Under sunlight irradiation, electricity generated by the solar cell is outputted to the electrochromic device via terminals of the cell so as to change the color of an electrochromic layer. The color contrast within the electrochromic system controls the incident light intensity falling on solar cell and thereby determines the output current of the solar cell.

Although electrochromic technology has been researched and developed for many years, so far only electrochromic rear-view mirror has been massively commercialized, and other types of large-area electrochromic devices still encounter the problem of non-uniform change of color, also called iris effect, which phenomenon is illustrated in FIG. 3. Referring to FIG. 3, it is noted that, in a planar structure 300 provided by the above-mentioned patents, the path lengths of electric fields at the periphery (where the electrode 302 is located) and the center area 304 of the employed electrodes 302 are different from each other, which leads to variation in the impedances, and results in significant difference in color concentration between the periphery (where the electrode 302 is located) and the center area 304.

SUMMARY OF THE INVENTION

Accordingly, the present invention is directed to a photosensitive electrochromic device, in which a thin-film solar cell module serves as an element of the device converting light energy into electric energy for performing color change.

The present invention is directed to a photosensitive electrochromic device, which is able to overcome iris effect and suitable for mass production.

The present invention provides a photosensitive electrochromic device, which includes a transparent non-conductive substrate, a thin-film solar cell module and an electrochromic solution. The thin-film solar cell module is a monolithic series-connected module and includes a transparent substrate and a plurality of thin-film solar cells located on the transparent substrate, wherein the thin-film solar cells are connected in series, and the above-mentioned electrochromic solution is between the transparent non-conductive substrate and the thin-film solar cell module.

Based on the above, the photosensitive electrochromic device of the present invention adopts the following design: the monolithic series-connected thin-film solar cell module is used to drive the electrochromic solution, wherein an anode layer and a cathode layer of the thin-film solar cell module are deposited on one transparent substrate, so as to form the anode and the cathode of the photosensitive electrochromic device on the same surface. When sunlight irradiates the thin-film solar cell module, the module directly produces current that induces redox reaction to occur in the electrochromic solution, thereby changing the color of the electrochromic solution. In addition, the photosensitive electrochromic device of the present invention is compatible with the current fabricating process of thin-film solar cell module, and therefore, the present invention is favourable for mass production. In particular, because the anode layers and the cathode layers between the thin-film solar cells are connected in series, there is no need to dispose additional circuit wires in the photosensitive electrochromic device, which contributes to the reduction of fabrication costs and time.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
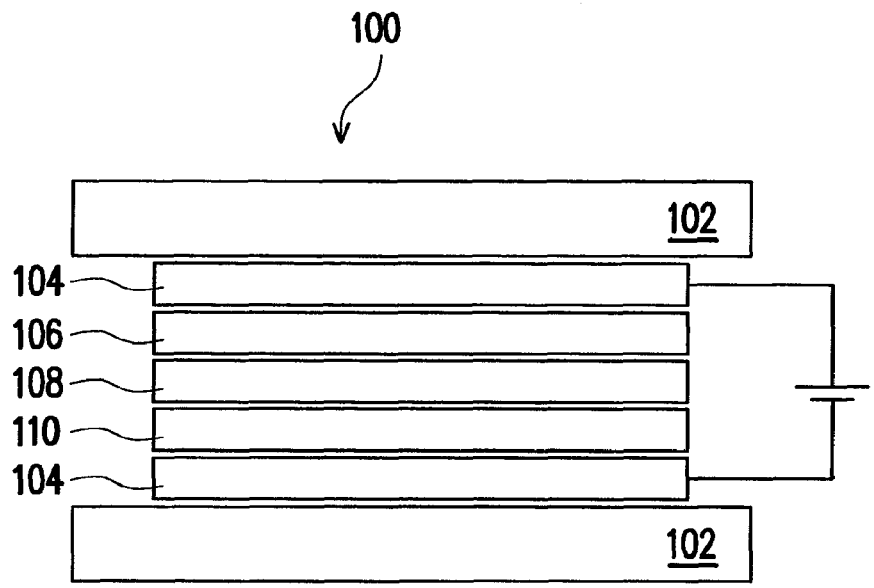
FIG. 1 is a structural view of a conventional solid-type electrochromic device.
Figure 2:
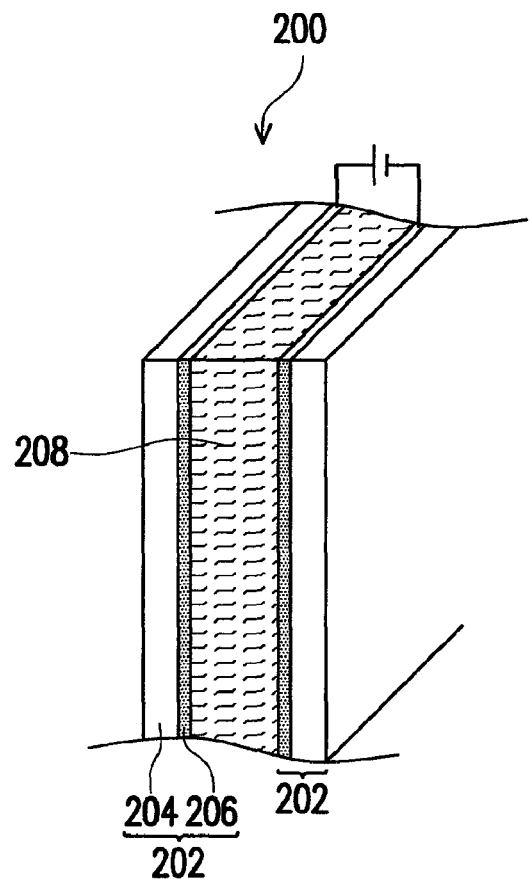
FIG. 2 is a structural view of a conventional liquid-type electrochromic device.
Figure 3:
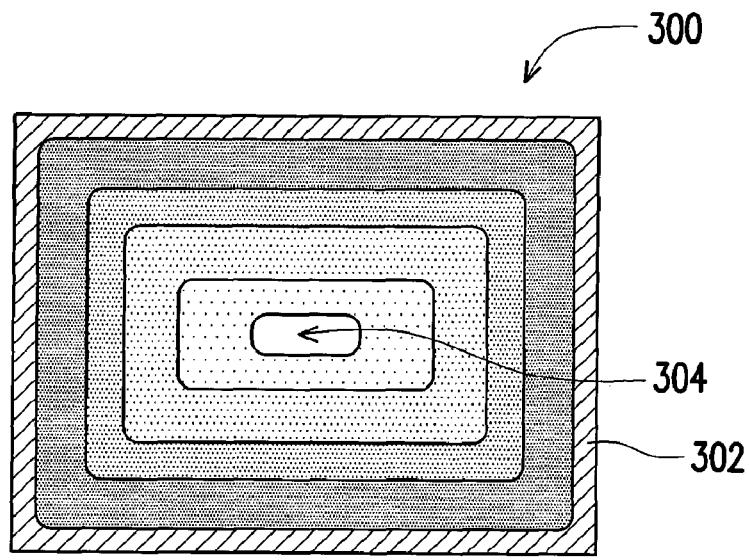
FIG. 3 is a two-dimension diagram showing an iris effect of a conventional electrochromic device.

Hereinafter reference is made in detail to the embodiments of the invention, and examples of which are illustrated in the accompanying drawings. Wherever possible, the same reference numbers are used in the drawings and the description to refer to the same or similar parts.

Figure 4:
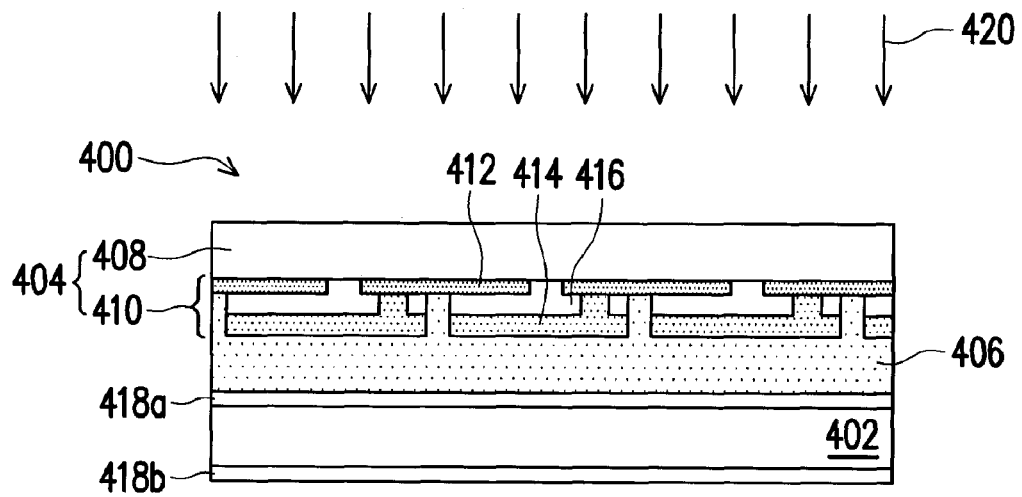
FIG. 4 is a schematic cross-sectional view of a photosensitive electrochromic device according to the first embodiment of the present invention.

FIG. 4 is a cross-sectional structural diagram of a photosensitive electrochromic device according to the first embodiment of the present invention. Referring to FIG. 4, a photosensitive electrochromic device 400 of the first embodiment includes a transparent non-conductive substrate 402, a thin-film solar cell module 404 and an electrochromic solution 406. The thin-film solar cell module 404 herein has a monolithic series-connected module structure. In FIG. 4, the thin-film solar cell module 404 includes a transparent substrate 408 and a plurality of thin-film solar cells 410 located on the transparent substrate 408. The thin-film solar cells 410 are connected in series. The thin-film solar cell module 404 in the first embodiment is, for example, a silicon thin-film solar cell module, a CIGS thin-film solar cell module or a CdTe thin-film solar cell module.

Figure 5:
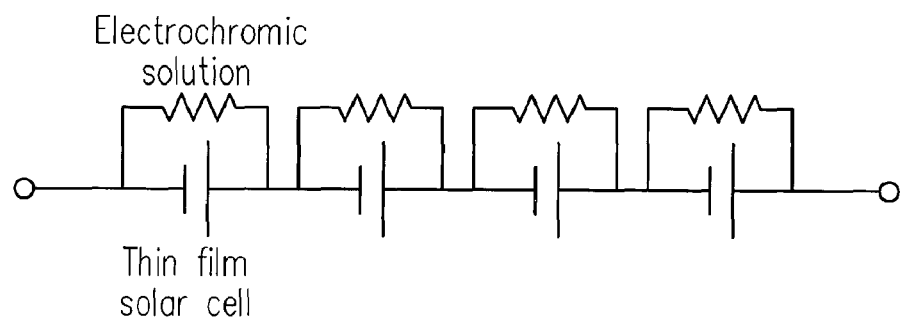
FIG. 5 is a circuit diagram of the photosensitive electrochromic device of FIG. 4.

Continuing to FIG. 4, since the voltage of each thin-film solar cell 410 is very small, the thin-film solar cells 410 are preferably formed into a module in practice; taking FIG. 4 as an example, the thin-film solar cells 410 include a plurality of anode layers 412 disposed on a surface of the transparent substrate 408, a plurality of cathode layers 414 disposed on the anode layers 412, and a plurality of semiconductor thin films 416 located between the anode layers 412 and the cathode layers 414. The anode layer 412 of each thin-film solar cell 410 is electrically connected to one adjacent cathode layer 414, so that the thin-film solar cells 410 are connected in series, and FIG. 5 is the circuit diagram of the photosensitive electrochromic device of FIG. 4. A material for forming the above anode layer 412 is, for example, transparent conductive oxide (TCO). A material of the cathode layer 414 is generally TCO with an additive metal (for example, silver); however, considering that the photosensitive electrochromic device 400 requires a very low charge density, the cathode layer 414 may be formed by TCO, so as to make the entire photosensitive electrochromic device 400 pervious to light.

In the first embodiment, the transparent non-conductive substrate 402 is, for example, glass, plastic or other appropriate flexible substrates. A material of the transparent substrate 408 of the thin-film solar cell module 404 is, for example, glass, plastic or a flexible substrate. A composition of the electrochromic solution 406 is, for example, at least one redox-type organic small molecule electrochromic material and at least one solvent, wherein the redox-type organic small molecule electrochromic material is one selected from the group consisting of cathodic electrochromic material, anodic electrochromic material, and a combination thereof. The above-mentioned cathodic electrochromic material is, for example, methyl viologen, ethyl viologen, heptyl viologen (HV), benzyl viologen or propyl viologen; the anodic electrochromic material is, for example, dimethylphenazine, phenylene diamine or TMPD (N,N',N,N'-tetramethyl-p-phenylenediamine) and the redox potential of the electrochromic material is less than 3V. In addition, the composition of the electrochromic solution 406 further includes alkali metallic salt, for example, lithium trifluoro methanesulfonate, lithium perchlorate or tetraalkylammonium salt. Furthermore, the electrochromic solution 406 includes a proper amount of polymers for example, PEO (polyethylene oxide), PPO (polypropylene oxide) or acrylic (polymethylmethacrylate, PMMA), so as to increase the viscosity of the electrochromic solution 406. The solvent in the electrochromic solution 406 is, for example, propylene carbonate (PC), ethyl carbonate (EC), γ-butyrolactone, acetonitrile, tetrahydrofuran or n-methylpyrrolidone (NMP).

The anode layers 412 and the cathode layers 414 of the above-mentioned thin-film solar cells 410 also serve as the anodes and cathodes of the photosensitive electrochromic device 400, as shown in FIG. 4. When sunlight 420 enters the photosensitive electrochromic device 400 through the surface of the transparent substrate 408, the thin-film solar cells 410 immediately generate a plurality of electron-hole pairs. Current generated by the thin-film solar cells 410 transmits to the electrochromic solution 406 through the anode layers 412 and the cathode layers 414, so as to cause a redox reaction within the transparent and colorless electrochromic solution 406.

The current from the thin-film solar cells 410 is converted into ionic current in the electrochromic solution 406; therefore, even though the anode layers 412 and the cathode layers 414 simultaneously contact the electrochromic solution 406 when electric current is generated, short circuit will be prevented. In addition, a reflective layer 418a or 418b maybe deposited on the transparent non-conductive substrate 410 to form a mirror surface; for example, a material of the reflective layer 418a or 418b includes one of silver and aluminium thin film coatings.

FIGS. 6A-6E are cross-sectional diagrams illustrating a process flow of fabricating a photosensitive electrochromic device according to the second embodiment of the present invention.

Figure 6A:
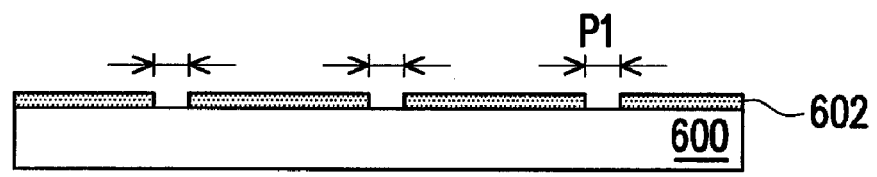
FIGS. 6A-6E are schematic cross-sectional views illustrating a process flow of fabricating a photosensitive electrochromic device according to the second embodiment of the present invention.

Referring to FIG. 6A first, by conducting the step of FIG. 6A, a TCO thin film is formed on the transparent substrate 600. Then, a first laser scribing process is performed to remove the TCO thin film within the areas P1 so as to form a plurality of anode layers 602.

Figure 6B:
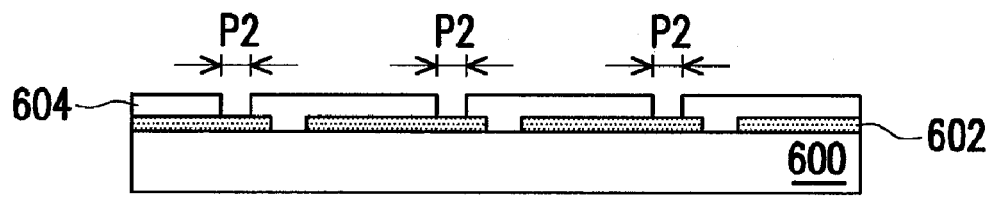

Next referring to FIG. 6B, a plasma-enhanced chemical vapor deposition (PECVD) process is performed to implement continuous deposited film on the transparent substrate 600 and the anode layers 602 so as to form the semiconductor thin film 604, and then a second laser scribing process is performed to remove a portions of the semiconductor thin film 604 that is within the areas P2 and the semiconductor thin film 604 is separated into a plurality of semiconductor thin films 604.

Figure 6C:
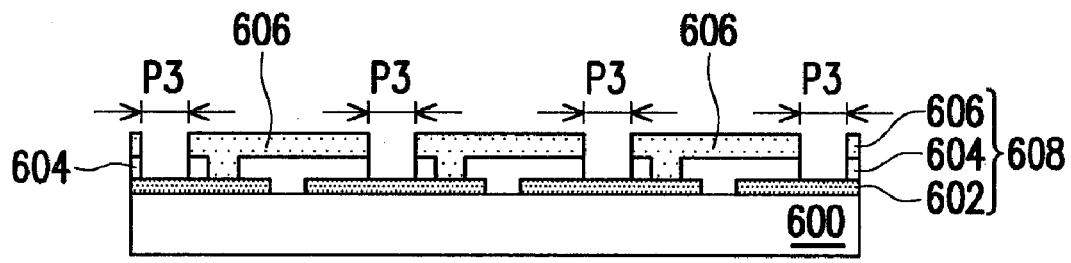

Referring to FIG. 6C, a physical vapor deposition (PVD) process is performed on the anode layers 602 and the semiconductor thin films 604 to deposit another TCO thin film and a metal layer successively, followed by conducting a third laser scribing process to remove the TCO thin film and the metal layer within the areas P3, so as to form the cathode layers 606. Accordingly, the thin-film solar cells 608 respectively constituted of the anode layer 602, the semiconductor thin film 604 and the cathode layer 606 are formed. The anode layer 602 of each thin-film solar cell 608 is electrically connected to the cathode layer 606 of one adjacent thin-film solar cell 608 through the area P2. When the processes are completed, adjacent thin-film solar cells 608 are interconnected with each other in series by the metal layer (i.e., top portion of the cathode layers 606) to the TCO thin films (i.e., the anode layers 602), and the above mentioned modulization process may be accomplished on the transparent substrate 600 (for example, glass).

In addition, the transmittance of the module is adjustable by controlling an interval between adjacent cathode layers 606, which is based on the principle that the exposed areas of the anode layers 602 are inversely proportional to the electric field density of the anodes, and the higher the electric field density is, the darker the electrochromic shading area becomes; the lower the electric field density is, the lighter the electrochromic shading becomes. In other words, since the interval of the adjacent cathode layers 606 in FIG. 6C is greater than the interval of the adjacent cathode layers 414 in FIG. 4, when other elements remain unchanged, the electric field density of the anodes in FIG. 6C is lower than the electric field density of the anodes in FIG. 4, and correspondingly the electrochromic shading of the anodes in FIG. 4 is darker than the electrochromic shading in FIG. 6C. Besides, when the interval between the adjacent cathode layers 606 is increased, the light-transmitting area is increased accordingly.

Figure 6D:
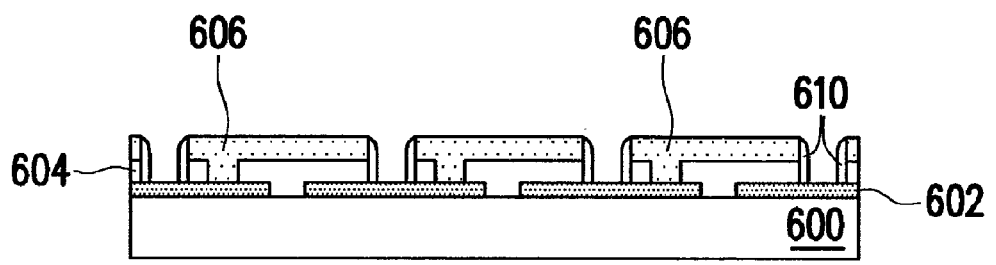

After the step of FIG. 6C, another step illustrated by FIG. 6D may be optionally performed. In FIG. 6D, a plurality of passivation layers 610 are respectively formed on the sidewalls of each semiconductor thin film 604 to protect the semiconductor thin films 604 from being affected by, for example, certain electrochromic solutions which may be corrodible on the semiconductor thin films 604.

Figure 6E:
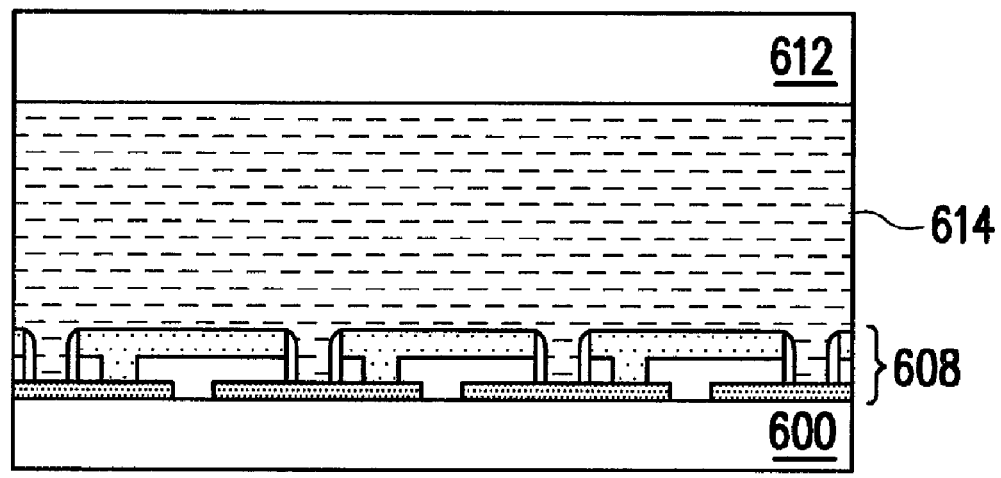

Further referring to FIG. 6E, the modulization process on the transparent substrate 600 is finished, wherein the transparent non-conductive substrate 612, the electrochromic solution 614 and the structure of FIG. 6D are combined together.

Figure 7:
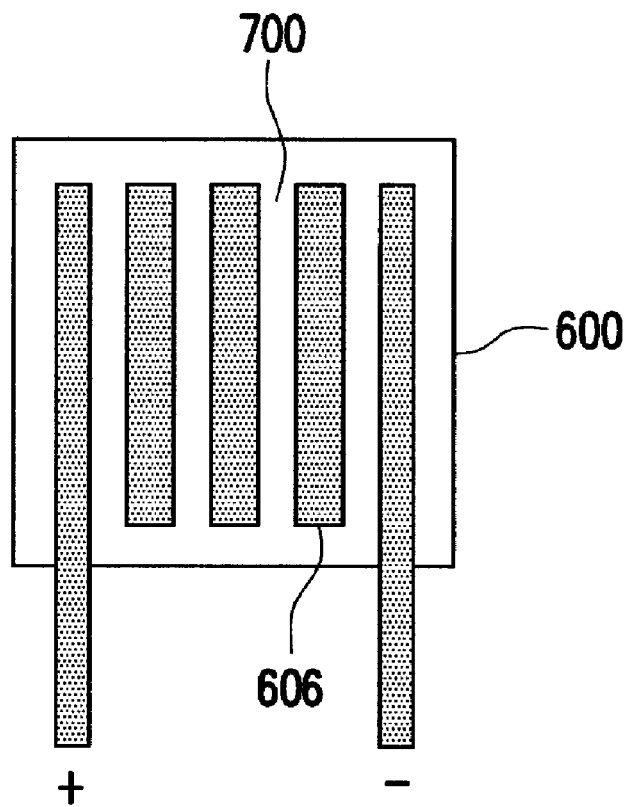
FIG. 7 is a top view of the photosensitive electrochromic device of FIG. 6E before color changing.

FIG. 7 is a top view of the photosensitive electrochromic device of FIG. 6E, wherein only the transparent substrate 600 and the cathode layers 606 formed by deposited metal are illustrated. A blank area 700 in FIG. 7 represents the anode of the photosensitive electrochromic device.

Figure 8A:
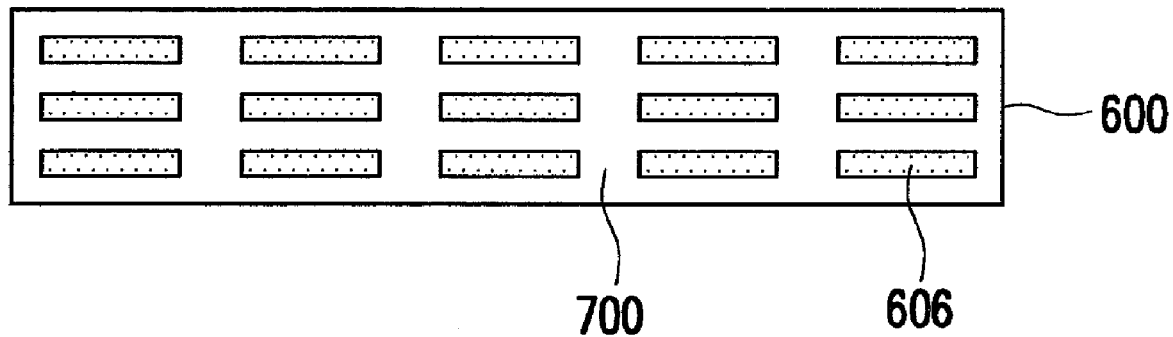
FIG. 8A is a top view of the light-transmitting-type photosensitive electrochromic device of FIG. 6E before color changing.
Figure 8B:
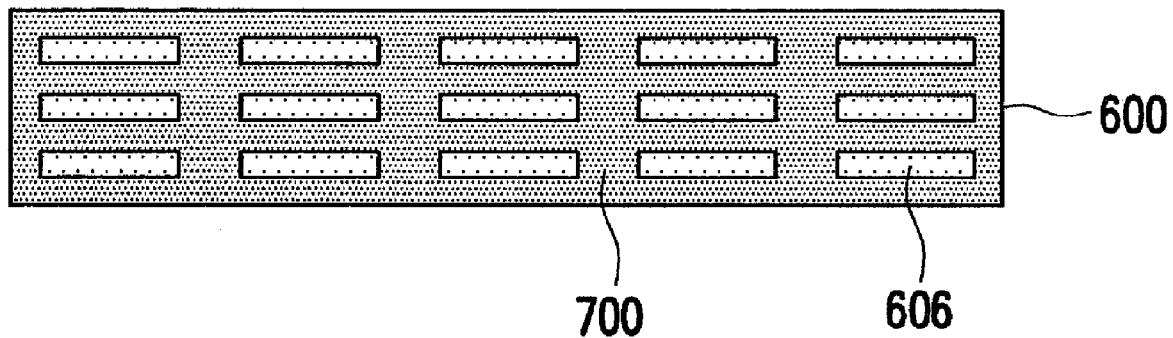
FIG. 8B is a top view of the light-transmitting-type photosensitive electrochromic device of FIG. 6E after color changing.

FIG. 8A is a top view of a photosensitive electrochromic device constituted of a see-through type thin-film solar cell module. When sunlight irradiates the photosensitive electrochromic device, the thin-film solar cells (for example, 608 as shown by FIG. 6E) immediately generate electron-hole pairs, so that redox reaction occurs at the anodes and the cathodes in the electrochromic solution 614 (for example, 614 as shown by FIG. 6E) and changes the color thereof. As the redox reaction continues under sunlight irradiation, the color changing spreads out to the whole electrochromic solution, the originally colorless area 700 becomes colored, as shown by FIG. 8B.

The photosensitive electrochromic device of the present invention uses a thin-film solar cell module to perform electrochromic shading, but other types of thin-film solar cell modules, for example, CIGS thin-film solar cell module or CdTe thin-film solar cell module, may be used to generate electricity as well.

In order to show the efficiency of the present invention, some experiments are performed as follows, wherein a silicon thin-film solar module is exemplarily tested.

The First Experiment

Figure 9:
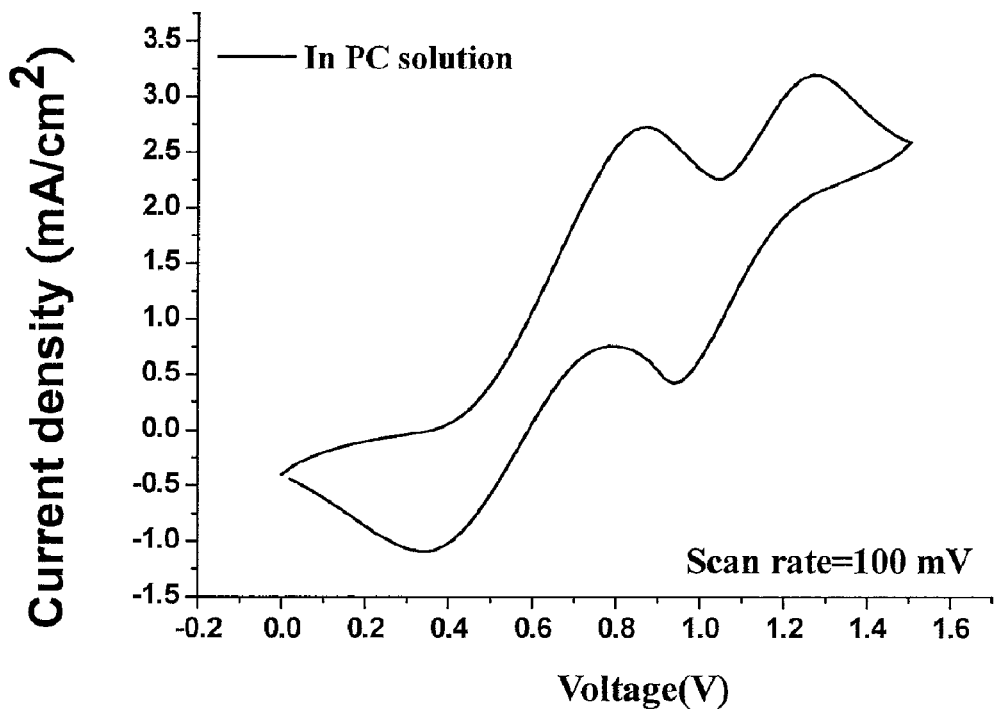
FIG. 9 is a cyclic voltammograms graph of a silicon thin-film solar cell, wherein an anodic organic small molecule electrochromic material is TMPD and a cathodic organic small molecule electrochromic material is HV.
Figure 10:
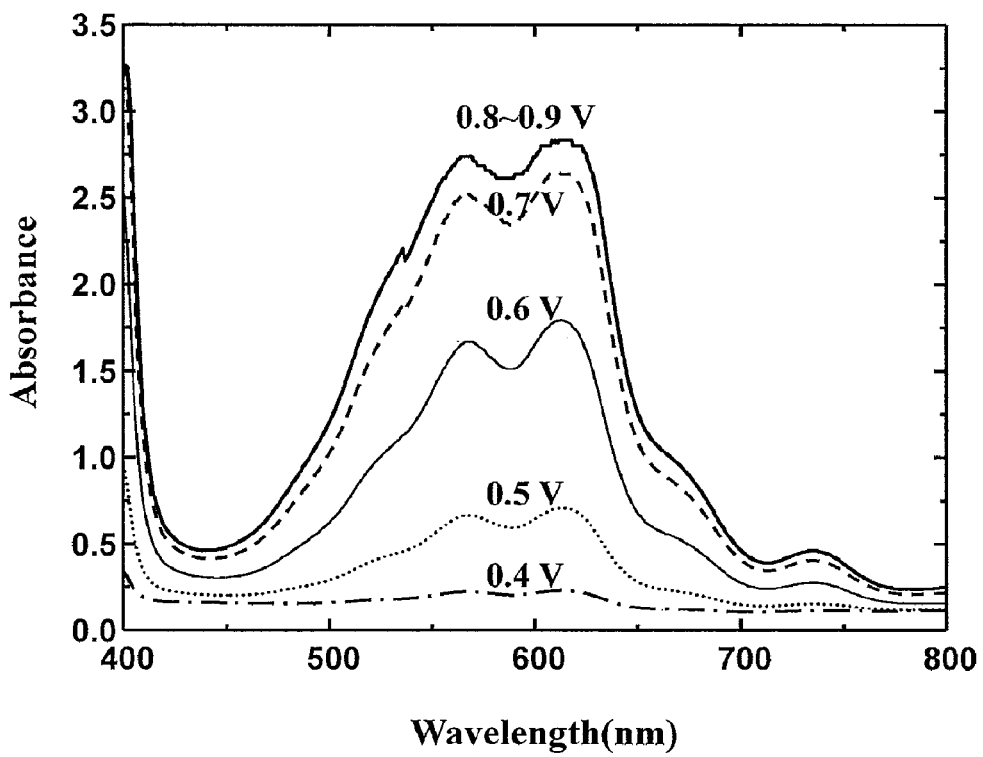
FIG. 10 is an absorption spectra graph of a silicon thin-film solar cell, wherein an anodic organic small molecule electrochromic material is TMPD and a cathodic organic small molecule electrochromic material is HV.
Figure 11:
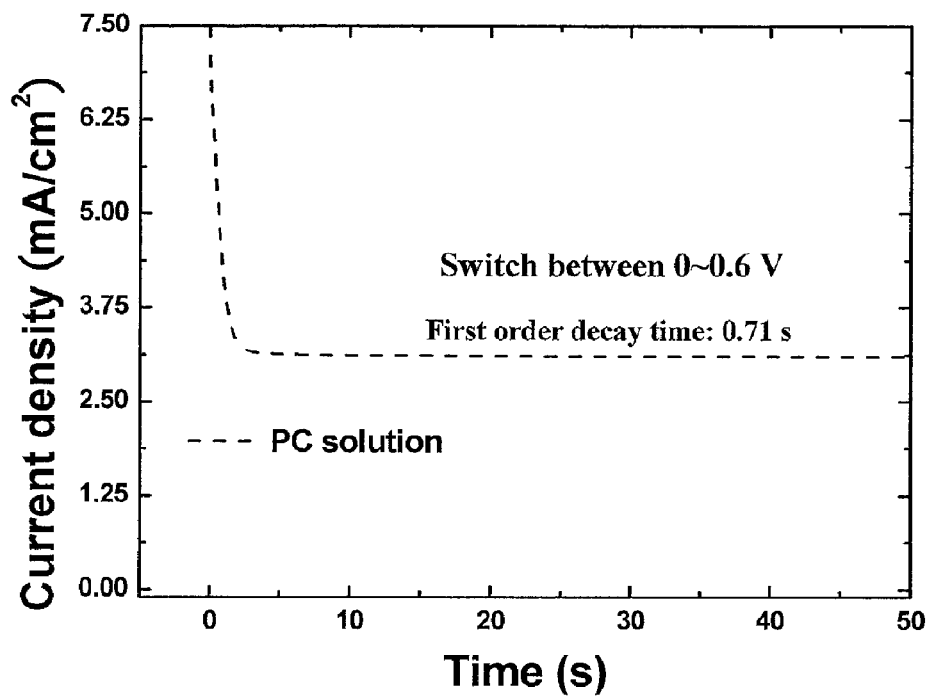
FIG. 11 is a current response graph of a silicon thin-film solar cell, wherein an anodic organic small molecule electrochromic material is TMPD and a cathodic organic small molecule electrochromic material is HV.

A C-V graph scanning (cyclic voltammograms scanning) on an electrochromic solution is performed, wherein the composition of the electrochromic solution contains solvent of PC, anodic organic small molecule electrochromic material of TMPD, cathodic organic small molecule electrochromic material of HV, electrolyte salt of lithium perchlorate ($LiCiO_4$) with molar concentration of 0.1M, respectively, the scanning rate is 100 mV/s and the scanning covers a range of 0V and 1.6V. As shown by FIG. 9, during the scanning, there is a first oxidation peak at 0.8V corresponding to the oxidation color peak of TMPD; and there is a second oxidation peak corresponding to the oxidation peak of HV. In the reduction course, the first reduction peak (at the higher volt) is corresponding to the reduction peak of HV and the second reduction peak (at the lower volt of 0.4V) is corresponding to the reduction peak of TMPD. It is known from FIG. 9 that the lowest coloring potential is about 0.6V, where a significant coloring effect occur, the changing in absorption spectrum of the electrochromic material during the potential scan can be observed from the UV-Vis absorption spectrum as shown in FIG. 10. It is shown in FIG. 10 that when the redox potential is greater than 0.4V, the electrochromic solution turn from transparent to color state and the color changing becomes significant when the potential is greater than 0.6V. The two characteristic absorption peaks shown in FIG. 10 are contributed by both TMPD and HV. When the potential is greater than 0.8V, the color absorption changes non-linearly with potential. The above-mentioned feature suggests that a better operation level is under the voltage of 0.8V. In terms of current response characteristic, when the potential level is controlled in the range of 0-0.6V, the reaction time may be less than 1 second, as shown by FIG. 11.

The Second Experiment

A first continuous, uniform layer of transparent conductive film layer is deposited on a properly cleaned glass which forms the front electrode, follows by a first laser scribing step, which scribes through the entire layer thickness, wherein the wavelength of the pulse laser is 266 nm, 355 nm or 1064 nm. The first laser scribing process is to remove the transparent conductive film layer within an areas such as P1 in FIG. 6A. When the laser removing is finished, the glass is put in a cleaner to rinse the residuary particles away from the scribed region so as to obtain an anode layer. The width between the adjacent cells determines the power output of the thin film solar cell module.

Further, a continuous p- and n-type silicon thin film layer is deposited by PECVD process with a total thickness of about 2 to 3 micron Further, a second laser scribing step is performed, which is for removing the deposited layer on the anode layer within an areas such as P2 in FIG. 6B. The line to be scribed is spaced from the first scribed line by about tens micrometer, and the silicon thin-film layer is removed by with a pulse laser having a wavelength of 532 nm.

The above-mentioned deposited glass is put in a vacuum sputtering apparatus to sputter a rear electrode (for example, metal back reflector silver), wherein the rear electrode reflects the light leaking from the silicon layer, which further increase light absorption efficiency of the device. Further, a third laser scribing step with a pulse laser having wavelength of 532 nm is performed, which is for removing the deposited layers on the anode layer within an areas such as P3 in FIG. 6C. Accordingly, a cathode layer is obtained. Finally, a cleaning process is performed so as to rinse the residuary particles within the scribing region away and a silicon thin-film solar cell module is fabricated.

The Third Experiment

Figure 12:
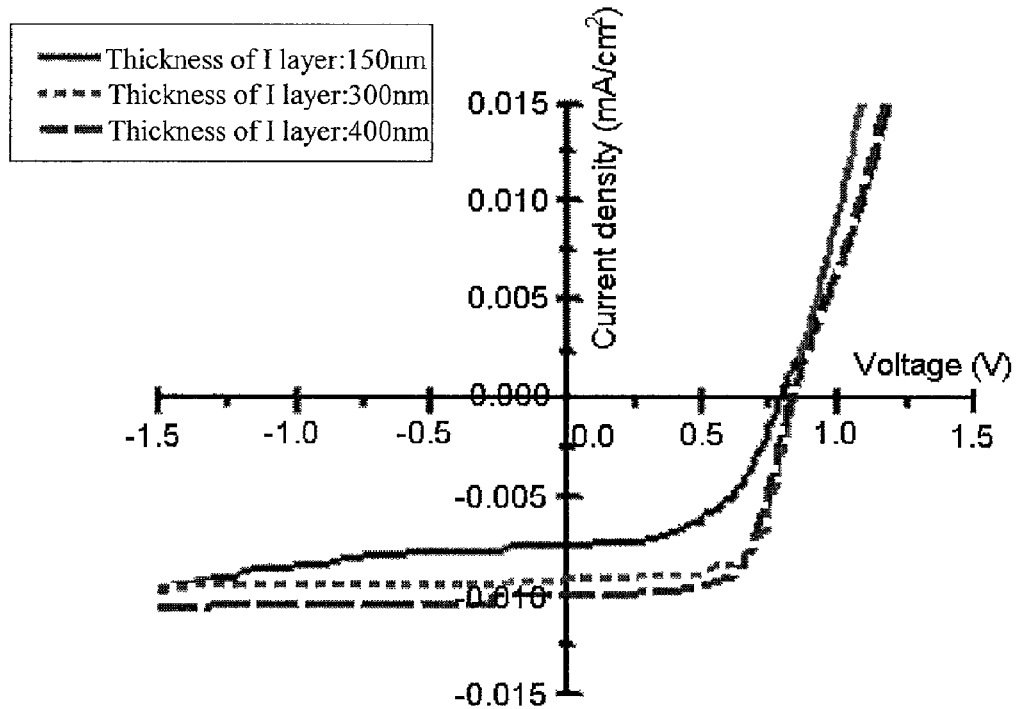
FIG. 12 is an IV curve (current-voltage curve) of a see-through type photosensitive electrochromic device.

Due to the low redox potential and small charge density requirement of the organic electrochromic solution, when the power output of the silicon thin-film solar cell is sufficient to cause the electrochromic reaction, the above-mentioned back metal electrode is omitted, and the cathode layer may be formed by TCO alone. FIG. 12 is an IV curve (current-voltage curve) of a see-through type photosensitive electrochromic device with an area of 0.5 cm×0.5 cm. The third experiment indicates that a reduced thickness of the intrinsic layer of a-Si (amorphous silicon) has little influence on the open-circuit voltage Voc but has a significant influence on the current density Jsc where the current density Jsc is reduced by about 30%. Table 1 describes in detail the influence of the reduced thickness of the a-Si intrinsic layer on the electric performance of the silicon thin-film solar cell. Since the redox current of the employed organic small molecules is lower than Jsc of the see-through type silicon thin-film solar cell, the see-through type silicon thin-film solar cell is preferred to drive the organic small molecule electrochromic material in order to increase the transparency of the whole device.

TABLE 1

| thickness of intrinsic layer | Voc (V) | Jsc (mA/cm$^2$) | FF (fill factor) | Pmax (W) | Efficiency % |
|---|---|---|---|---|---|
| 150 nm | 0.7898 | 7.44 | 53.4213 | 0.00078 | 3.1373 |
| 300 nm | 0.8373 | 9.2 | 69.0118 | 0.0013 | 5.3145 |
| 400 nm | 0.8317 | 10.13 | 65.82 | 0.0013 | 5.5456 |

The Fourth Experiment

A transparent glass substrate with a cross section of 7.5 cm×7.5 cm is provided, and a solvent-proof tape adheres to the substrate at the edge position thereof, wherein the solvent-proof tape serves as a spacer. An anodic electrochromic material TMPD with molar concentration of 0.1M according to the molecular weight (mol.wt) is dissolved in PC solvent. Then, lithium perchlorate ($LiCiO_4$) with molar concentration of 0.1M is added and the solution is stirred into a well-mixed, transparent, colorless electrochromic solution. The obtained solution is spread on the above-mentioned transparent glass substrate with a silicon thin-film solar cell module overlays the transparent glass substrate. Based on the above, the photosensitive electrochromic device is constructed.

The open-circuit voltage Voc of the silicon thin-film solar cell module of an area of 38.4 cm$^2$ is 6.38V, the short circuit current Isc thereof is 62.73 mA, FF is 51.37%, Pmax is 0.21 W and the efficiency is 5.35%. When sunlight irradiates the photosensitive electrochromic device, in one minute, the electrochromic solution starts redox reaction right under the anode thereof and the electrochromic solution starts changing color, i.e., the color turns from transparent and colorless to light blue and then to dark blue and gradually expands across the whole anode area.

The Fifth Experiment

A transparent glass substrate with a cross section of 7.5 cm×7.5 cm is provided, and a solvent-proof tape adheres to the substrate at the edge position thereof, wherein the solvent-proof tape serves as a spacer. An anodic electrochromic material TMPD with molar concentration of 0.1M and a cathodic electrochromic material HV with molar concentration of 0.1M are respectively dissolved in PC solvent. Then, lithium perchlorate ($LiCiO_4$) with molar concentration of 0.1M is added in the solution and the solution is stirred into well-mixed transparent, colorless electrochromic solution. The obtained solution is spread on the above-mentioned transparent glass substrate and a silicon thin-film solar cell module overlays the transparent glass substrate. Accordingly, the photosensitive electrochromic device is constructed.

In comparison with the fourth experiment, the interval between the adjacent cathode layers in the light-transmitting silicon thin-film solar cell module is increased and the number of series connected cells is reduced. As a result, the open-circuit voltage Voc of the silicon thin-film solar cell module is 5.37V, the short circuit current Isc thereof is 48.51 mA. When sunlight irradiates the photosensitive electrochromic device, in one minute, the electrochromic solution starts changing color right under the anode and cathode layers thereof and the color is changed from transparent and colorless to light blue and then dark blue and gradually expands across the whole anode and cathode areas.

The Sixth Experiment

A ribbon wire is bonded to a silicon thin-film solar cell module with an open-circuit voltage Voc of 6.38V, a short circuit current Isc of 62.73 mA and Pmax is 0.21 W The wire outputs the power generated by the solar cell module.

A transparent glass substrate with a cross section of 7.5 cm×7.5 cm is provided, and a solvent-proof tape adheres along the edge of the substrate, wherein the solvent-proof tape serves as a spacer. An anodic electrochromic material TMPD with molar concentration of 0.1M according to the mol.wt is dissolved in PC solvent. Then, lithium perchlorate ($LiClO_4$) with molar concentration of 0.1M is added and the solution is stirred into a well mixed, transparent, colorless electrochromic solution. The obtained solution is spread on the above-mentioned transparent glass substrate and a silicon thin-film solar cell module overlays the transparent glass substrate. Thereby, the photosensitive electrochromic device is constructed.

When sunlight irradiates the photosensitive electrochromic device, in one minute, the electrochromic solution starts redox reaction right under the anode layer of the module and the electrochromic solution starts changing color, i.e., the color is gradually changed from transparent and colorless to light blue and then dark blue. When the positive end and the negative end of the ribbon wire are connected, the electrochromic material starts fading and finally resumes to the original transparent color.

Figure 13:
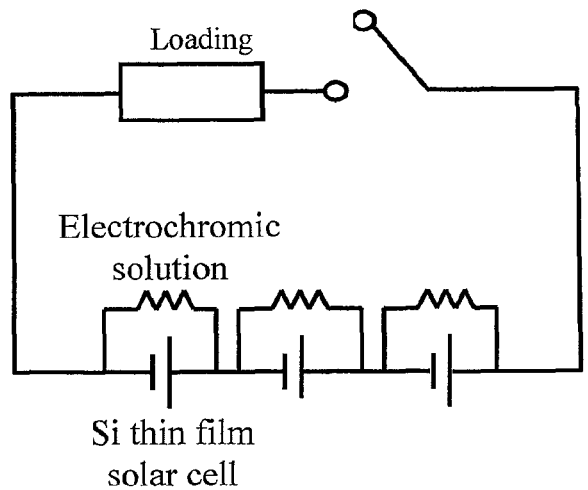
FIG. 13 is a circuit diagram of a photosensitive electrochromic device of the present invention.

The observed phenomenon of the above-mentioned experiment can be explained as follows. Since the impedance of a metal is lower than the impedance of a electrochromic solution, when the positive end and the negative end to the ribbon wire are not connected, the electron-hole pairs generated by the silicon thin-film solar cell module after light irradiation directly enable an electrochromic element system to change the color thereof; however, when the positive end and the negative end of the ribbon wire are connected, the total current generated by the silicon thin-film solar cell module is output as D.C. electric, as shown by FIG. 13.

In order to control the power output of the photosensitive electrochromic device of the present invention, the following switch designs are applicable.

Figure 14:
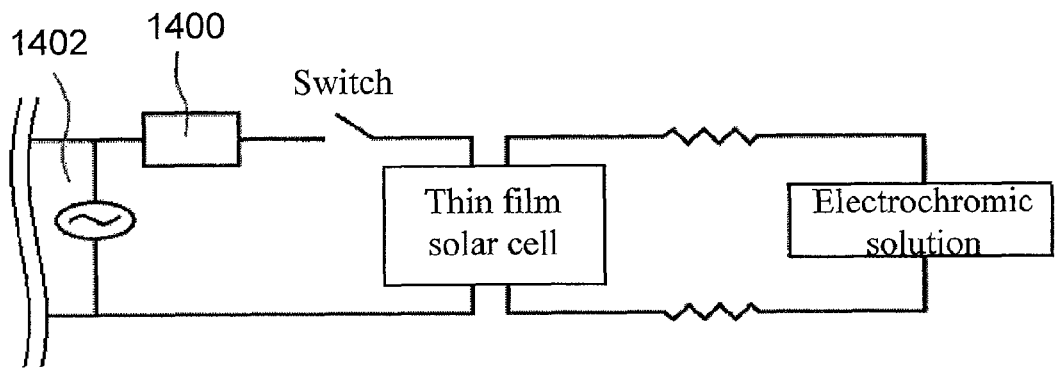
FIG. 14 is a circuit diagram showing the electrical connection between a photosensitive electrochromic device of the present invention and an output switch.
Figure 15:
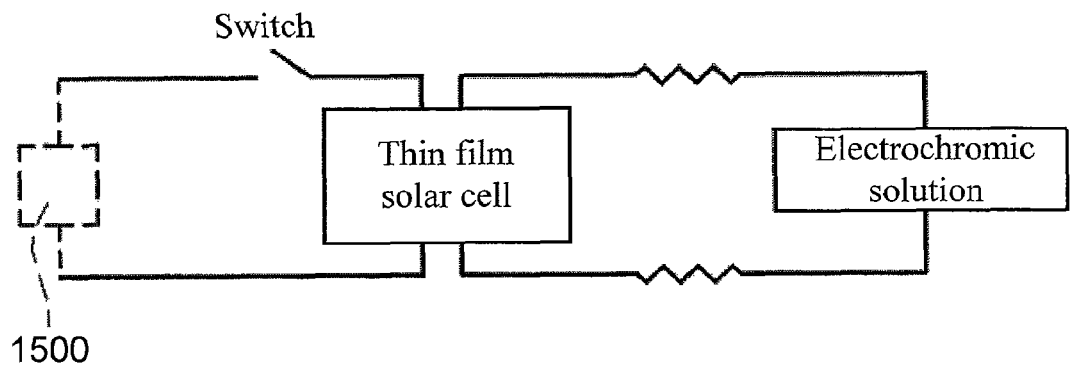
FIG. 15 is a circuit diagram showing the electrical connection between a photosensitive electrochromic device of the present invention and another output switch.
Figure 16:
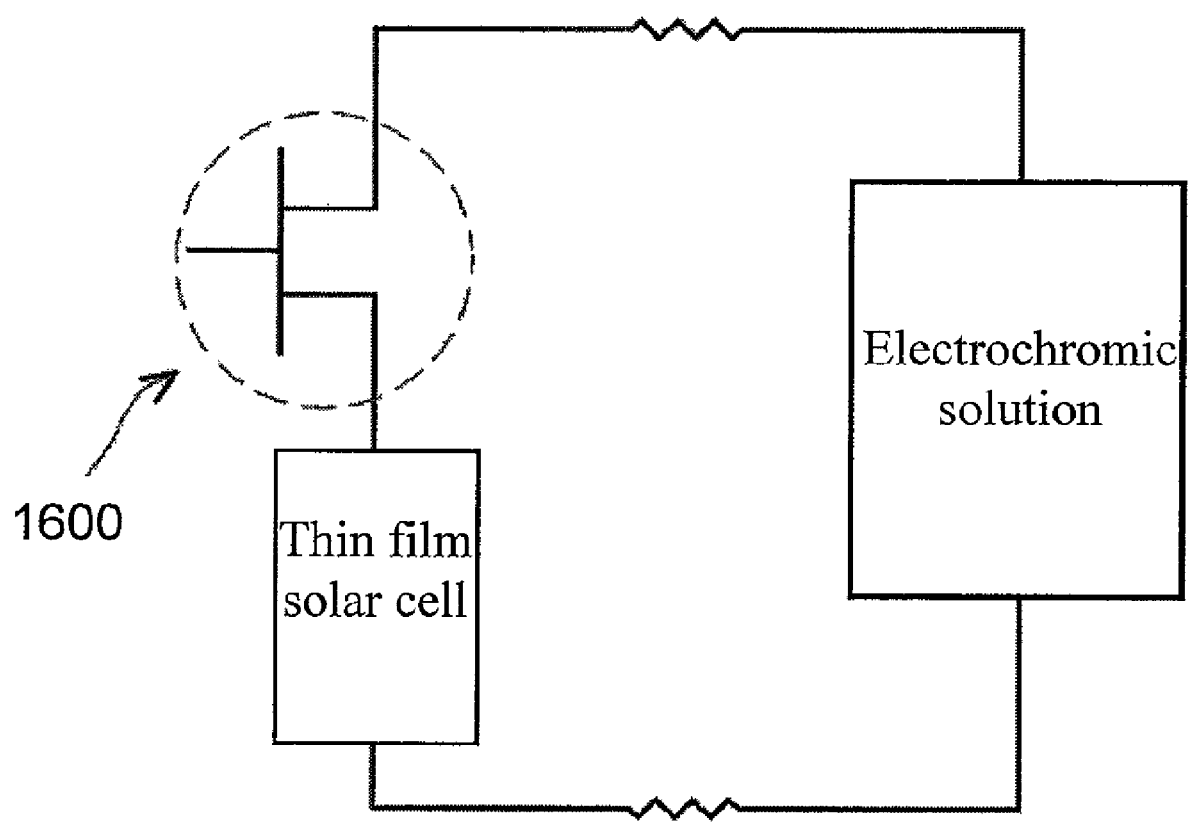
FIG. 16 is a circuit diagram showing a photosensitive electrochromic device of the present invention and a TFT.

1. The current generated by a thin-film solar cell module is converted into AC current by using a DC/AC converter 1400, and the converted current may serve as a AC power supply 1402 to provide electricity, as shown by FIG. 14.
2. The current generated by a thin-film solar cell is connected into a DC charge storage device 1500 (Thereafter, the device 1500 may serve as a charge storing device to provide DC electric), as shown by FIG. 15.
3. A thin film transistor (TFT) 1600 is connected to the anode terminal and cathode terminal of a thin-film solar cell module, wherein the TFT 1600 serves as a switch to solely turn on/off the connection between the thin-film solar cell module and the external circuit. In this way, the photosensitive electrochromic device becomes an active device, as shown by FIG. 16. In addition, the amount of TFT is not limited to one. If desired, the TFT may be more than one.

In summary, the photosensitive electrochromic device of the present invention uses a monolithic series-connected thin-film solar cell module, wherein the anode layer and the cathode layer of the module respectively serve as the anode and the cathode of the photosensitive electrochromic device. Since the structure of the device of the present invention is compatible with the current fabricating processes of the thin-film solar cell module, the present invention is suitable for mass production. In particular, since the anode layers and the cathode layers within the thin-film solar cell module are connected in series, there is no need to additionally dispose extra circuit wires in the photosensitive electrochromic device, which contributes to the reduction of fabrication costs and time.

Different from the prior art where the power of the conventional device is provided by the periphery of the electrode, in the photosensitive electrochromic device of the present invention, the required electrodes are evenly distributed on the whole thin-film solar cell module, so that the electric field generated in the invented device is uniform. The color changing of the electrochromic solution at different areas has the same uniformity and the conventional iris effect problem is avoided.

It is apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A photosensitive electrochromic device, comprising:
   a transparent non-conductive substrate;
   a thin-film solar cell module having a monolithic series-connected module structure, the thin-film solar cell module comprising:
      a transparent substrate; and
      a plurality of thin-film solar cells located on the transparent substrate, wherein the thin-film solar cells are connected in series; and
   an electrochromic solution disposed between the transparent non-conductive substrate and the thin-film solar cell module.

2. The photosensitive electrochromic device as claimed in claim 1, wherein the thin-film solar cell module comprises a silicon thin-film solar cell module, a CIGS thin-film solar cell module or a CdTe thin-film solar cell module.

3. The photosensitive electrochromic device as claimed in claim 1, wherein the transparent nonconductive substrate comprises glass, plastic or flexible substrate.

4. The photosensitive electrochromic device as claimed in claim 1, wherein the transparent substrate of the thin-film solar cell module comprises glass, plastic or flexible substrate.

5. The photosensitive electrochromic device as claimed in claim 1, further comprising a DC/AC converter converting the current provided by the thin-film solar cell module into a AC power supply.

6. The photosensitive electrochromic device as claimed in claim 1, further comprising a DC charge storage device storing the current generated by the thin-film solar cell module.

7. The photosensitive electrochromic device as claimed in claim 1, further comprising at least one thin film transistor, respectively connected to an anode terminal and a cathode terminal of the thin-film solar cell module to individually control a switch between the thin-film solar cell module and an external circuit.

8. The photosensitive electrochromic device as claimed in claim 1, wherein a composition of the electrochromic solution comprises at least one redox-type organic small molecule electrochromic material and at least one solvent.

9. The photosensitive electrochromic device as claimed in claim 8, wherein the redox-type organic small molecule electrochromic material is one selected from the group consisting of a cathodic electrochromic material, an anodic electrochromic material, and a combination thereof.

10. The photosensitive electrochromic device as claimed in claim 1, further comprising a reflective layer deposited on the transparent non-conductive substrate to form a mirror surface.

11. The photosensitive electrochromic device as claimed in claim 10, wherein a material of the reflective layer comprises one of silver and aluminium thin film coatings.

12. The photosensitive electrochromic device as claimed in claim 1, wherein the thin-film solar cells comprise:

a plurality of anode layers disposed on the surface of the transparent substrate;
a plurality of cathode layers disposed on the anode layers; and
a plurality of semiconductor thin films disposed between the cathode layers and the anode layers.

13. The photosensitive electrochromic device as claimed in claim 12, wherein the anode layer of one of the thin-film solar cells is electrically connected to the cathode layer of another thin-film solar cell.

14. The photosensitive electrochromic device as claimed in claim 12, further comprising a plurality of passivation layers respectively disposed on a plurality of sidewalls of each semiconductor thin film in the thin-film solar cells.

15. The photosensitive electrochromic device as claimed in claim 12, wherein the anode layers are exposed between the cathode layers and an electrochromic shading area of the electrochromic solution is adjustable by controlling an interval between the cathode layers.

16. The photosensitive electrochromic device as claimed in claim 12, wherein a material of the anode layers comprises transparent conductive oxide.

17. The photosensitive electrochromic device as claimed in claim 12, wherein a material of the cathode layers comprises transparent conductive oxide and metal.

* * * * *